(12) United States Patent
Sato et al.

(10) Patent No.: US 9,947,967 B2
(45) Date of Patent: Apr. 17, 2018

(54) FLUOROSULFONYL IMIDE SALT AND METHOD FOR PRODUCING FLUOROSULFONYL IMIDE SALT

(75) Inventors: Shimpei Sato, Suita (JP); Yasunori Okumura, Suita (JP); Yuichi Sato, Suita (JP); Yasuyuki Miyoshi, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 794 days.

(21) Appl. No.: 13/264,244

(22) PCT Filed: Nov. 26, 2010

(86) PCT No.: PCT/JP2010/071166
§ 371 (c)(1),
(2), (4) Date: Oct. 13, 2011

(87) PCT Pub. No.: WO2011/065502
PCT Pub. Date: Jun. 3, 2011

(65) Prior Publication Data
US 2012/0041233 A1 Feb. 16, 2012

(30) Foreign Application Priority Data

Nov. 27, 2009 (JP) ................. 2009-270836
Dec. 11, 2009 (JP) ................. 2009-282023
Oct. 22, 2010 (JP) ................. 2010-238023

(51) Int. Cl.
*H01M 10/0568* (2010.01)
*C01B 21/086* (2006.01)
*C01B 21/093* (2006.01)

(52) U.S. Cl.
CPC ....... *H01M 10/0568* (2013.01); *C01B 21/086* (2013.01); *C01B 21/0935* (2013.01)

(58) Field of Classification Search
CPC ............ H01M 10/0568; C01B 21/086
See application file for complete search history.

(56) References Cited

U.S. PATENT DOCUMENTS

| | | | | |
|---|---|---|---|---|
| 2,490,263 | A * | 12/1949 | Gaiser ............... | C03C 15/00 216/60 |
| 5,652,072 | A * | 7/1997 | Lamanna et al. ........... | 429/307 |
| 5,691,081 | A | 11/1997 | Krause et al. | |
| 5,723,664 | A | 3/1998 | Sakaguchi et al. | |
| 5,916,475 | A | 6/1999 | Michot et al. | |
| 6,254,797 | B1 | 7/2001 | Michot et al. | |
| 6,297,398 | B1 | 10/2001 | Pevere et al. | |
| 7,605,271 | B2 | 10/2009 | Uchimura et al. | |
| 2001/0025943 | A1 | 10/2001 | Michot et al. | |
| 2002/0004613 | A1 | 1/2002 | Pevere et al. | |
| 2004/0097757 | A1 | 5/2004 | Cernik et al. | |
| 2006/0223995 | A1* | 10/2006 | Uchimura et al. ........... | 544/59 |
| 2009/0123845 | A1 | 5/2009 | Zaghib et al. | |
| 2009/0292105 | A1 | 11/2009 | Michot | |
| 2011/0034716 | A1* | 2/2011 | Okumura et al. ........... | 556/69 |
| 2011/0178306 | A1 | 7/2011 | Michot | |
| 2012/0041233 | A1 | 2/2012 | Sato et al. | |
| 2012/0232285 | A1 | 9/2012 | Michot | |

FOREIGN PATENT DOCUMENTS

| | | |
|---|---|---|
| CA | 2 527 802 | 6/2007 |
| CN | 1273573 | 11/2000 |
| CN | 101252978 | 8/2008 |
| CN | 101456832 | 6/2009 |
| JP | 8-81436 | 3/1996 |
| JP | 8-511274 | 11/1996 |
| JP | 11-512563 | 10/1999 |
| JP | 2000-77099 | 3/2000 |
| JP | 2001-139540 | 5/2001 |
| JP | 2004-522681 | 7/2004 |
| JP | 2006-278167 | 10/2006 |
| JP | 2006-324167 | 11/2006 |

(Continued)

OTHER PUBLICATIONS

Hu et al. ("Synthesis of perhaloalkanesulfonyl halides and their sulfonamide derivatives" Inorganic Chemistry vol. 32, No. 23, 1993, pp. 5007-5010).*
Rohe et al. ("Zinc Compounds" in Ullman's Encyclopedia of Industrial Chemistry, 2005, p. 1).*
Fanderlik, "Glass Science and Technology: Silica Glass and its Application" vol. 11, 1991, pp. 194-270.*
"Zinc Fluoride Chemical Data Sheet", Cameo Chemicals, retrieved from https://cameochemicals.noaa.gov/chemical/4810 on Jul. 19, 2016.*
Houben-Weyl (Houben-Weyl Methods in Organic Chemistry, vol. E10—Organo-Fluorine Compounds, vols. 1-5 (4th Edition, Workbench Edition), pp. 95-114 provided).*
Cabot ("Corrosion Resistance of Hastelloy Alloys", Cabot Corp., 1984, pp. 1-88).*
Michot et al. (Machine Translation of WO 95/26056, published Sep. 1995).*
International Search Report dated Jan. 25, 2011 in International (PCT) Application No. PCT/JP2010/071166.
J. K. Ruff et al., "Imidodisulfuryl Fluoride, Cesium Imidodisulfuryl Fluoride, and Fluoroimidodisulfuryl Fluoride", Inorganic Synthesis, vol. 11, pp. 138-140, 1968.
B. Krumm et al., "Synthesis of Poly- and the First Perfluoroalkyl-$N(SO_2F)_2$ Derivatives: Improved Methods for the Preparation of $XN(SO_2F)_2$ (X =H, Cl) and Single-Crystal Diffraction Studies of $HN(SO_2Cl)_2$, $HN(SO_2F)_2$, and $CF_3CH_2N(SO_2F)_2$", Inorg. Chem. vol. 37, pp. 6295-6303, 1998.

(Continued)

Primary Examiner — Robert Havlin
(74) Attorney, Agent, or Firm — Wenderoth, Lind & Ponack, L.L.P.

(57) ABSTRACT

The present invention provides a method for producing a fluorisulfonylimide salt, which enables reducing the impurity content and continuous operation for a long time, and a fluorosulfonyl imide salt. The fluorosulfonyl imide salt of the present invention has a K content of 10,000 ppm or less. The method for producing a fluorosulfonyl imide salt of the present invention is that after a fluorination reaction of chlorosulfonyl imde or a salt thereof, the reaction solution is brought into contact with an aqueous alkaline solution so as to remove impurities. The fluorosulfonyl imide salt of the present invention, in which various impirities are reduced to extremely low levels, is useful as an electrolyte used in a lithium secondary battery, a capacitor or the like, an ionic liquid, or an intermediate for a sulfonyl imide salt, and the like. It is expected that use of the fluorosulfonyl imide salt of the present invention as an electrolyte leads to a high-performance electrochemical device.

6 Claims, 1 Drawing Sheet

(56) References Cited

FOREIGN PATENT DOCUMENTS

| JP | 2006-324554 | | 11/2006 | |
|---|---|---|---|---|
| JP | 2007-182410 | | 7/2007 | |
| WO | WO 95/26056 | * | 9/1995 | ............ H01M 10/40 |
| WO | 2010/010613 | | 1/2010 | |
| WO | 2011/065502 | | 6/2011 | |

OTHER PUBLICATIONS

Y. Matsuda et al., "Effect of Imide Salt Purity in Electrolytes on Charge-Discharge Performance of Negative Electrodes for Lithium Secondary Batteries", Proceedings of the 68$^{th}$ Annual Meeting of the Electrochemical Society of Japan, Mar. 25, 2001, pp. 232 with partial English translation.
Office Action dated Jun. 16, 2014 in corresponding European Application No. 10 833 347.7.
Chinese Office Action (with English translation) dated Apr. 3, 2013 in corresponding Chinese Application No. 201080017204.6).
Office Action dated Feb. 4, 2014 in corresponding Japanese Application No. 2012-062730, with English translation thereof.
Supplementary European Search Report dated Oct. 17, 2013 in European Application No. 10833347.7.
Office Action dated Nov. 4, 2013 in Chinese Application No. 201080017204.6, with English translation thereof.
Notice of Reasons for Rejection dated Nov. 18, 2014 in corresponding Japanese Patent Application No. 2012-062730 (with English translation).
Notice of Observation by a third party dated Jan. 30, 2015 in corresponding European Patent Application No. 10833347.7.
Request for Invalidation dated Feb. 9, 2015, in corresponding Chinese Patent No. 201080017204.6 (with English translation).
European Office Action dated Apr. 16, 2015, in corresponding European Application No. 10833347.7.
Third Party Observations issued Mar. 9, 2016 in corresponding European Application No. 10 833 347.7.
Examination Decision on Request for Invalidation issued Mar. 17, 2016 in corresponding Chinese Application No. 201080017204.6, with English translation.
Barbara Elvers et al. (Eds), Ullmann's Encyclopedia of Industrial Chemistry, 5$^{th}$ Ed., VCH, Weinheim, Germany, vol. A 28, 1996, pp. 537-538.
Office Action dated Jun. 14, 2016 in corresponding European Application No. 10 833 347.7.
Office Action dated Jul. 17, 2017 in European Application No. 10833347.7.

* cited by examiner

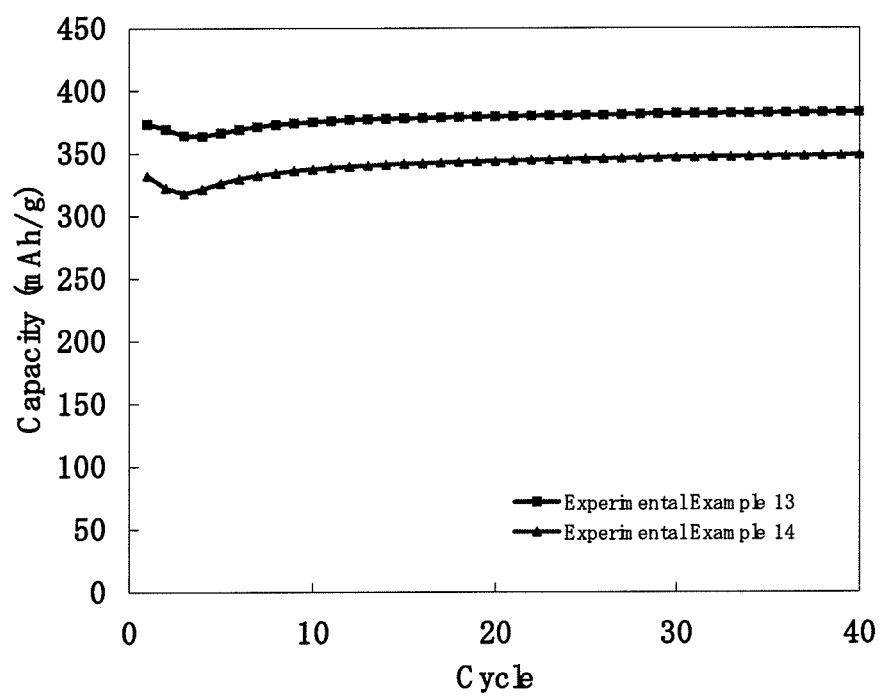

FLUOROSULFONYL IMIDE SALT AND METHOD FOR PRODUCING FLUOROSULFONYL IMIDE SALT

This application is a U.S. national stage of International Application No. PCT/JP2010/071166 filed Nov. 26, 2010.

TECHNICAL FIELD

The present invention relates to a fluorosulfonyl imide salt, and more particularly to a salt of N-(fluorosulfonyl)-N-(fluoroalkylsulfonyl)imide or di(fluorosulfonyl)imide and a method for producing the same.

BACKGROUND ART

A fluorosulfonyl imide salt such as N-(fluorosulfonyl)-N-(fluoroalkylsulfonyl)imide salt, di(fluorosulfonyl)imide, salt and derivatives thereof are useful as intermediates for compounds having a $N(SO_2F)$ group or an $N(SO_2F)_2$ group, and are also useful compounds in various applications, for example, electrolytes, additives for electrolytic solutions of fuel cells, selective electrophilic fluorinating agents, photo acid generators, thermal acid generators, and near infrared light-absorbing dyes. Particularly, since the fluorosulfonyl imide salt has high voltage endurance and conductivity, it is expected that various electrochemical devices having high performances can be obtained when the fluorosulfonyl imide salt is used as the electrolyte. Therefore, various studied have been made (Patent Documents 1 and 2).

Di(fluorosulfonyl)imides have conventionally been prepared by a halogen exchange reaction of chlorosulfonylimide using a fluorinating agent (Patent Documents 1 and 2, Non-patent Documents 1 and 2); by distilling fluorosulfonic acid ($HFSO_3$) in the presence of urea (Patent Document 3).

PRIOR ART

Patent Document

Patent Document 1: Japanese Published Patent Publication No. 2007-182410
Patent Document 2: Japanese Published Patent Publication No. 2004-522681
Patent Document 3: Japanese Published Patent Publication No. H08-511274

Non-Patent Document

Non-patent Document 1: John K. Ruff and Max Lustig, Inorg Synth. 11, 138-140 (1968)
Non-patent Document 2: Jean'ne M. Shreeve et al., Inorg. Chem. 1998, 37(24), 6295-6303

SUMMARY OF THE INVENTION

Problem to be Solved by the Invention

However, in a conventional synthesis of a fluorosulfonyl imide salt, raw materials to be used and fluorosulfonyl imide as the objective product have high acidity, and hydrogen halides such as hydrogen fluoride are formed as by-products upon reaction. Accordingly, when a general reaction vessel is used, there arises a problem that corrosion occurs due to these by-products and the like in a reaction vessel and thus eluted metal is mixed in the objective product as impurities. In order to prevent corrosion of the reaction vessel and peripheral members due to these by-products, it is necessary to frequently perform maintenance of the reaction vessel and device, which may sometimes interfere with a continuous operation. Furthermore, in the case where the by-products remain in the product, peripheral members may be corroded when the product is used in various applications.

In the reaction system, impurities derived from starting materials are also contained, in addition to by-product, and impurities derived from the by-products. From the viewpoint of purity of the product, the presence of these impurities is a problem which cannot be ignored. Particularly, in the case where impurities are contained in fluorosulfonyl imides, there is a problem that expected characteristics (such as voltage endurance, conductivity, battery characteristics and the like possessed originally by FSIs) cannot be obtained even when these fluorosulfonyl imides are used in various applications. According to the present inventors' study, it has become apparent that this tendency becomes most remarkable in the case where potassium (K) is contained as impurities and, for example, when fluorosulfonyl imides containing potassium as impurities are used in an electrolyte of a lithium secondary battery, a battery capacity decreases. Accordingly, in the case where fluorosulfonyl imides are used as an electrolyte of an electrochemical device, there is still room for improvement in regards to a reduction in impurities which cause deterioration of performances.

Under these circumstances, the present invention has been made and an object thereof is to provide a method for producing a fluorosulfonyl imide salt, which enables a continuous operation over a long period by suppressing corrosion, and to provide a high-performances electrolyte (fluorosulfonyl imide salt) which is less likely to cause a decrease in a capacity of electrochemical devices such as a secondary battery, a capacitor, a condenser and a solar battery when using a fluorosulfonyl imide salt having reduced content of impurities as, particularly, an electrolyte.

Solutions to the Problems

The gist of the fluorosulfonyl imide salt of the present invention, which could have achieved the object described above, resides in that a content of potassium (K) is 10,000 ppm or less.

Also, in the fluorosulfonyl imide salt of the present invention, a content of $FSO_3NH_2$ and/or $FSO_3H$ as impurities is preferably 30,000 ppm or less. Furthermore, in the fluorosulfonyl imide salt of the present invention, contents of Si, B, Fe, Cr, Mo and Ni are preferably 1,000 ppm or less, respectively. Also, in the fluorosulfonyl imide salt of the present invention, a total of the content of at least one kind of metal element selected from the group consisting of Zn, Cu and Bi is preferably 1,000 ppm or less. Furthermore, a content of Zn (zinc) is preferably 500 ppm or less. In addition, in the fluorosulfonyl imide salt of the present invention, a content of Cl (chlorine) is preferably 10,000 ppm or less.

The fluorosulfonyl imide salt of the present invention is preferably a di(fluorosulfonyl)imide salt. Also, it is a preferred embodiment of the present invention that the fluorosulfonyl imide salt is lithium di(fluorosulfonyl)imide.

Further, a method for producing the high-purity fluorosulfonyl imide salt having reduced content of impurities is also included in the present invention. The gist of the production method of the present invention resides bringing the reaction solution into contact with an aqueous alkali solution so as to remove impurities after a fluorination reaction of chlorosulfonyl imide or a salt thereof.

According to the method of the present invention, it is possible to obtain the above-described high-purity fluorosulfonyl salt having reduced content of impurities.

The contact is preferably performed by adding the reaction solution to the aqueous alkali solution. Also, it is recommended that the reaction solution is brought into contact with the aqueous alkali solution at a temperature of 5° C. to 50° C. Furthermore, it is desired that the amount of the aqueous alkali solution used is from 1 part by mass to 100 parts by mass based on 100 parts by mass of the reaction solution. The aspect in which ammonia water is used as the aqueous alkali solution is a recommended embodiment of the present invention.

The term "fluorosulfonyl imide" in the present invention includes, in addition to di(fluorosulfonyl)imide having two fluorosulfonyl groups, N-(fluorosulfonyl)-N-(fluoroalkyl-sulfonyl)imide having a fluorosulfonyl group and a fluorinated alkyl group. The term "chlorosulfonylimide", which is a starting material, is the same. The term "fluoroalkyl" means an alkyl group having 1 to 6 carbon atoms in which one or more hydrogen atoms are substituted with fluorine atoms, for example, the fluoroalkyl group includes a fluoromethyl group, a difluoromethyl group, a trifluoromethyl group, a fluoroethyl group, a difluoroethyl group, a trifluoroethyl group and a pentafluoroethyl group.

Effect of the Invention

According to the present invention, it is possible to obtain a fluorosulfonyl imide salt which exhibits high performances as an electrolyte of an electrochemical device.

According to the present invention, even when an acid is formed as a reaction by-product, a reaction vessel and peripheral members are less likely to be corroded, thus enabling a continuous operation for the production of a fluorosulfonyl imide salt, and also a fluorosulfonyl imide salt having reduced content of impurities can be provided. Also, since the content of impurities in the fluorosulfonyl imide salt of the present invention is reduced, it is expected that use of the fluorosulfonyl imide salt of the present invention as an electrolyte leads to a high-performance electrochemical device.

BRIEF DESCRIPTION OF THE DRAWING

FIG. 1 is a graph showing the results of Experimental Example 13 and Experimental Example 14.

MODE FOR CARRYING OUT THE INVENTION

The present invention will be described in detail below. In the fluorosulfonyl imide salt of the present invention, the content of impurities is reduced to extremely low levels. Specifically, the feature of the fluorosulfonyl imide salt of the present invention is that the content of K (potassium) as impurities is 10,000 ppm or less (on a mass basis). When the content of K is high, in the case of using the fluorosulfonyl imide salt as an electrolyte employed in an electrochemical device, there may be likely to occur a problem that K is interposed between layers of graphite to cause deterioration of electrodes, leading to a decrease in the capacity. In contrast, when the content of K is 10,000 ppm or less, the problem may be less likely to occur. The content of K is preferably 7,000 ppm or less, more preferably 5,000 ppm or less, still more preferably 1,000 ppm or less, and yet more preferably 500 ppm or less. The lower limit of the content of K may be about 0.01 ppm, more preferably 0.1 ppm, and still more preferably 1 ppm.

Also, the contents of Si, B, Fe, Cr, Mo and Ni as impurities in the fluorosulfonyl imide salt of the present invention are preferably 1,000 ppm or less (on a mass basis), respectively. That is, when all of the elements are contained, the content of each of elements Si, B, Fe, Cr, Mo and Ni in the fluorosulfonyl imide salt is preferably 1,000 ppm or less. The content of each of elements Si, B, Fe, Cr, Mo and Ni in the fluorosulfonyl imide salt is more preferably 800 ppm or less, and still more preferably 500 ppm or less.

As described above, in the production process of the fluorosulfonyl imide salt, hydrogen halide and a halide are formed in the reaction system. Since the formation reaction (fluorination reaction) of fluorosulfonyl imides proceeds under an anhydrous atmosphere, corrosion of the reaction vessel and device are less likely to proceed during the reaction. However, since the reaction system is freed from an anhydrous atmosphere upon a post-treatment, the reaction solution may be likely to become acidic. Therefore, the reaction vessel is corroded by contact with the reaction solution containing an acidic component. As a result, impurities derived from the reaction vessel are mixed in the product. For example, when a reaction vessel made of glass is used, silicon (Si) and boron (B) are respectively mixed in the product. In the case of a reaction vessel made of stainless steel, iron (Fe), chromium (Cr) and nickel (Ni) are respectively mixed in the product. In the case of a reaction vessel made of Hastelloy (registered trademark), nickel (Ni), chromium (Cr), molybdenum (Mo) and iron (Fe) are respectively mixed in the product.

However, according to below-mentioned method of the present invention, the reaction solution is brought into contact with an aqueous alkali solution after the fluorination reaction of chlorosulfonyl imides, whereby, the acidic component in the reaction solution is quickly neutralized. As a result, corrosion of the reaction vessel can be prevented. Also, by-products formed in the fluorination reaction forms a water-soluble composite together with components contained in the aqueous alkali solution. On the other hand, since the fluorosulfonyl imide salt as the objective product is oil-soluble, a product having reduced content of impurities can be obtained by separating the organic layer using a simple liquid separation operation.

The content of Si in the fluorosulfonyl imide and/or the fluorosulfonyl imide salt is preferably 800 ppm or less, more preferably 500 ppm or less, still more preferably 100 ppm or less, yet more preferably 50 ppm or less, and yet further preferably 20 ppm or less. The same shall apply to the contents of B, Fe, Cr, Mo and Ni, and each content is preferably 800 ppm or less, more preferably 500 ppm or less, still more preferably 100 ppm or less, yet more preferably 50 ppm or less, and yet further preferably 20 ppm or less. The content of the impurities is preferably as small as possible and, most preferably, the impurities are not contained in the fluorosulfonyl imide salt of the present invention (content of impurities: 0%). For example, regarding the lower limit of the content of the impurities, the contents (total amount) of any one or more kinds of Si, B, Fe, Cr, Mo and Ni may be about 0.1 ppm. The lower limit may be about 0.5 ppm. Furthermore, the lower limit may be about 1 ppm. As long as the content of impurities are within the above range, corrosion of peripheral members and a problem derived from impure ionic components are less likely to arise even when the fluorosulfonyl imide salt of the present invention is used as an ionic conductor employed in the below-mentioned various electrochemical devices.

Among the below-mentioned production methods of the present invention, in order to produce the fluorosulfonyl imide salt having the contents of Si, B, Fe, Cr, Mo and Ni reduced respectively within the above range, it is preferred to add the reaction solution to an aqueous alkali solution so as to bring both solutions into contact with each other in an alkali contact step after a fluorination reaction. The reason is that the contents of the elements can be more efficiently reduced by this alkali contact step.

Also, the fluorosulfonyl imide salt of the present invention is preferably a fluorosulfonyl imide salt in which the content of by-products containing fluorine atoms formed in a fluorination step, for example, $FSO_2NH_2$ (sulfonyl amides), $FSO_3H$ and the like has also been reduced. The content (total amount) of these by-products is preferably 30,000 ppm or less (on a mass basis), more preferably 10,000 ppm or less, and still more preferably 5,000 ppm or less. Most preferably, these by-product containing fluorine atoms are not contained in the fluorosulfonyl imide salt of the present invention and, for example, the content (lower limit) may be preferably about 0.1 ppm, and more preferably 1 ppm or more. Conventionally, it was difficult to remove by-products containing fluorine atoms, such as $FSO_2NH_2$ and $FSO_3H$. However, when the production method of the present invention is employed, it is possible to obtain a fluorosulfonyl imide salt in which the contents of $FSO_2NH_2$ and $FSO_3H$ have been reduced within the above range.

Furthermore, in the fluorosulfonyl imide salt of the present invention, it is preferred that the content of a component derived from a fluoride (fluorinating agent) used in the below-mentioned fluorination reaction, such as at least one kind of an element selected from the group consisting of elements of Groups 11 to 15 and Periods 4 to 6 is also reduced. Specifically, the content (total amount) of metal derived from the fluorinating agent is preferably 1,000 ppm or less. Similar to the impurities derived from the reaction device, the amount of impurities in the product is preferably small. Particularly, when the fluorosulfonyl imide salt of the present invention is used as an ionic conductor employed in various electrochemical devices, the content of impure ion components in the fluorosulfonyl imide salt is preferably as small as possible. The content of the metal element derived from the fluorinating agent is more preferably 500 ppm or less, still more preferably 100 ppm or less, yet more preferably 50 ppm or less, and yet further preferably 10 ppm or less. As described hereinafter, it is exemplified that using a fluorinating agent containing zinc (Zn), copper (Cu) or bismuth (Bi) among the elements is a preferred method for producing a fluorosulfonyl imide salt according to the present invention. The total of the content of at least one kind of metal element selected from the group consisting of Zn, Cu and Bi derived from the fluorinating agent in the product is preferably 1,000 ppm or less. The content (total amount) of the contents of at least one kind of metal element selected from the group consisting of Zn, Cu and Bi is more preferably 500 ppm or less, still more preferably 100 ppm or less, yet more preferably 50 ppm or less, and yet further preferably 10 ppm or less. Since a fluorinating agent containing zinc (Zn) is most preferably used among these elements, the content of zinc (Zn) in the fluorosulfonyl imide salt of the present invention is preferably 1,000 ppm or less, more preferably 500 ppm or less, still more preferably 100 ppm or less, yet more preferably 50 ppm or less, and yet further preferably 10 ppm or less. Since the element such as zinc may be sometimes contained in a starting material used as the fluorinating agent, it is sometimes difficult to completely remove the elements, and excess purification operation may cause a decrease in the yield of the product. Accordingly, the lower limit may be about 0.1 ppm, and more preferably 1 ppm or more.

In the fluorosulfonyl imide salt of the present invention, not only the content of Zinc, but also the content of a halogen, particularly chlorine (Cl) is also preferably 10,000 ppm or less. In the case where chlorine remains in the fluorosulfonyl imide salt, peripheral members may be corroded when used in various electrochemical devices. The content is preferably 5,000 ppm or less, more preferably 1,000 ppm or less, still more preferably 500 ppm or less, yet more preferably 100 ppm or less, yet further preferably 50 ppm or less, and most preferably 20 ppm or less. Also, the lower limit is preferably about 0.1 ppm, and more preferably 1 ppm or more.

It is considered that the fluorosulfonyl imide salt of the present invention having the thus reduced content of impurities exhibits high ionic conductivity at a temperature ranging from low temperature to high temperature, and also contributes to an improvement in safety of the device at high temperature.

The kind and content of the impurities can be analyzed by the below-mentioned ICP emission spectrochemical analysis method and NMR measurement.

There is no particular limitation on the method for producing a fluorosulfonyl imide salt of the present invention as long as the amount of various impurities is reduced within the above range and, for example, the following method is preferably employed.

The method for producing a fluorosulfonyl imide salt of the present invention has a feature in that, after the fluorination reaction of chlorosulfonyl imide or a salt thereof, the reaction solution is brought into contact with an aqueous alkali solution.

As described above, in the fluorination reaction of chlorosulfonyl imides, substances which exhibit acidity as they are or after dissolving in water, for example, hydrogen halides derived from raw materials and fluorides (fluorinating agent) such as hydrogen fluoride, and halides are generated as by-products. In the present invention, it is considered that since the reaction solution after the fluorination reaction is brought into contact with an aqueous alkali solution, an acid component in the reaction solution is neutralized and thus corrosion of the reaction vessel is prevented. Also, the reason why the amount of impurities in the product is reduced by the present invention is considered as follows. After completion of the reaction, components contained in starting materials and a fluoride form a composite, together with components contained in an aqueous alkali solution, and the composite is extracted into the aqueous layer. Therefore, a fluorosulfonyl imide salt having a low content of impurities is obtained as a product by separating the organic layer.

As described above, in the present invention, after the fluorination reaction of chlorosulfonyl imide or a salt thereof, the reaction solution is mixed with an aqueous alkali solution thereby bringing the reaction solution into contact with the aqueous alkali solution (alkali contact step). As used herein, "after the fluorination reaction" is not limited only to immediately after completion of the fluorination reaction, and also includes the case where, after the fluorination reaction, the cation exchange reaction of fluorosulfonyl imide (or a salt thereof) is performed and then an alkali contact step is performed.

As the aqueous alkali solution, an aqueous solution of a basic substance may be used. Examples of the basic substance include ammonia; aliphatic amines, for example, primary, secondary or tertiary alkylamines having an alkyl group of 1 to 8 carbon atoms, such as ethylamine, propylamine, butylamine, pentylamine, hexylamine, heptylamine, octylamine, dimethylamine, diethylamine, dipropylamine, dibutylamine, 2-ethylhexylamine, trimethylamine, triethylamine, tripropylamine and tributylamine, alkylenediamines having an alkylene group of 1 to 8 carbon atoms, such as ethylenediamine, diethylenetriamine, triethylenetetramine, tetraethylenepentamine and pentaethylenehexamine; alkanolamines such as monoethanolamine, diethanolamine, triethanolamine, monoisopropanolamine, diisopropanolamine and triisopropanolamine; alicyclic amines such as cyclohexylamine and dicyclohexylamine; aromatic amines such as benzylamine and metaxylenediamine; ethylene oxide adducts of these amines; formamidine; guanidine; amidine; heterocyclic amines such as diazabicycloundecene, diazabicyclononene, piperidine, morpholine, piperazine, pyrimidine, pyrrole, imidazole, imidazoline, triazole, thiazole, pyridine and indole; hydroxides, carbonates, phosphates, silicates, borates, formates, acetates, stearates, palmitates, propionates, oxalates and the like of alkali metals (lithium, sodium, potassium, etc.) or alkali earth metals (magnesium, calcium, strontium, barium, etc.); and the like. Among these, an aqueous solution of amine-based compounds such as ammonia and ethylamine is preferred from the viewpoint of a yield. From the viewpoint of compatibility with water, aliphatic amines, alkanolamines, and ethylene oxide adducts of these amines, and heterocyclic amines are preferred as the basic substance. From the viewpoint of easy availability and a moderate price, it is particularly recommended that ammonia water is used as the aqueous alkali solution.

The basic substance used in the aqueous alkali solution is a basic substance in which the content of metal components such as Zn, K, Fe, Cr, Ni and Na as impurities is preferably 100 ppm or less, and more preferably 10 ppm or less.

Also, the content of metal components such as Zn, K, Fe, Cr, Ni and Na in water used to prepare an aqueous alkali solution is preferably 100 ppm or less, and more preferably 10 ppm or less. Water having a low content of such metal components can be prepared, for example, by an ion-exchange resin, a distiller and an ultrapure water system. Also, water used to prepare an aqueous alkali solution may be selected by using electric conductivity as a measure. For example, it is recommended that water having electrical resistivity of 0.1 MΩcm or less (25° C.) is used.

An organic solvent may be contained in the aqueous alkali solution. It is possible to use, as the organic solvent, those which are the same as the below-mentioned reaction solvent. When the organic solvent is used, the amount of the organic solvent in the aqueous alkali solution is preferably adjusted to 1 part by mass to 50 parts by mass, more preferably 1 part by mass to 30 parts by mass, and still more preferably 1 part by mass to 10 parts by mass, based on 100 parts by mass of water to prepare an aqueous alkali solution.

The content of metal components such as Zn, K, Fe, Cr, Ni and Na in the aqueous alkali solution prepared using the basic substance and water is preferably 100 ppm or less, and more preferably 10 ppm or less. The kind and content of the impurities can be analyzed by the below-mentioned ICP emission spectral analysis method.

The amount of the basic substance in the aqueous alkali solution may be enough if it enables forming composite together with a specific element contained in a fluoride used in the below-mentioned fluorination reaction. For example, the basic substance is preferably contained in an amount of 0.3 mol or more and 30 mol or less per 1 mol of the fluoride, more preferably 0.5 mol or more, and still more preferably 1 mol or more, or preferably 15 mol or less, and more preferably 10 mol or less.

The basic substance may be contained in the aqueous alkali solution in an amount within the above range, and there is no particular limitation on the used amount of the aqueous alkali solution. Too large amount of the aqueous alkali solution is not preferred since the amount of waste water may increase and the objective product may flow out into the aqueous alkali solution, leading to a decrease in extraction efficiency. Accordingly, the amount of the aqueous alkali solution used is preferably adjusted within a range from 1 part by mass to 100 parts by mass, based on 100 parts by mass of the reaction solution. Too small amount of the aqueous alkali solution used is not preferred from the viewpoint of the production process since it may be sometimes difficult to sufficiently remove impurities and by-products may be sometimes precipitated. The amount of the aqueous alkali solution used is more preferably from 5 parts by mass to 50 parts by mass, and still more preferably from 10 parts by mass to 30 parts by mass.

It is recommended that the reaction solution is brought into contact with an aqueous alkali solution at a temperature of 5° C. to 50° C. In the case of adding the reaction solution to the aqueous alkali solution, heat may sometimes be generated. Therefore, it is preferred to use an aqueous alkali solution at temperature within the above range from the viewpoint of obtaining the product more safely. Also, the addition of the reaction solution and contact with the aqueous alkali solution may be performed while cooling the aqueous alkali solution using a water bath or an ice bath. The temperature of the aqueous alkali solution is more preferably from 10° C. to 40° C., and still more preferably from 20° C. to 30° C. From the viewpoint of effectively preventing heat generation by contact between the reaction solution and the aqueous alkali solution, it is preferred to add the reaction solution while stirring the aqueous alkali solution.

The concentration of fluorosulfonyl imide contained in the reaction solution is preferably 1% by mass to 70% by mass. When the concentration is too high, the reaction may become ununiform. In contrast, when the concentration is too low, it is not economical because of low productivity per 1 batch. The concentration of fluorosulfonyl imide contained in the reaction solution is more preferably from 3% by mass to 60% by mass, and still more preferably from 5% by mass to 50% by mass.

The alkali contact step may be a step which enables contact between the reaction solution and the aqueous alkali solution. Examples thereof include an aspect in which the reaction solution after a fluorination reaction is added to an aqueous alkali solution thereby bringing them into contact with each other; an aspect in which an aqueous alkali solution is added to the reaction solution after a fluorination reaction thereby bringing them into contact with each other; an aspect in which the reaction solution after a fluorination reaction and an aqueous alkali solution are simultaneously added to a different reaction vessel thereby bringing both solutions into contact with each other; and the like. Among these aspects, an aspect, in which the reaction solution after a fluorination reaction is added to an aqueous alkali solution thereby bringing both solutions into contact with each other, is preferred. There is also no particular limitation on the aspect in the case of adding the reaction solution. Examples of the aspect of the addition of the reaction solution include, but are not limited to, an aspect in which the reaction solution is continuously poured into an aqueous alkali solution in small quantities; an aspect in which a predetermined amount of the reaction solution is continuously added dropwise to an aqueous alkali solution; an aspect in which the reaction solution is intermittently poured into or added dropwise to an aqueous alkali solution in several portions; and the like.

There is no particular limitation on the time of contact between the reaction solution and the aqueous alkali solution, as long as it is possible to perform sufficient contact between the reaction solution and the aqueous alkali solution. For example, it is preferred to bringing the reaction solution and the aqueous alkali solution into contact with each other while stirring for about 1 minute (more preferably about 5 minutes) after completion of the addition of the reaction solution. When the contact time is too short, impurities may sometimes remain in the product, and removal of the acidic component may sometimes become insufficient, resulting in the occurrence of corrosion of the reaction vessel.

The step of contact between the reaction solution and the aqueous alkali solution may be performed in a conventionally known reaction vessel, and there is no particular limitation on the kind thereof. It is possible to use all of conventionally known reaction vessels, for example, a reaction vessel made of stainless steels such as SUS304, SUS316, SUS329, SUS430 and SUS444; a reaction vessel made of carbon steel; a reaction vessel made of nickel; a reaction vessel made of titanium; a reaction vessel made of chromium; a reaction vessel made of a nickel base alloy which contains nickel as a main component, and also contains molybdenum, chromium, niobium, iron and the like in a small amount (for example, Hastelloys (registered trademark) (Hastelloy C22, Hastelloy C276, Hastelloy B, etc.), Inconels (registered trademark) (Inconel 600, Inconel 625, Inconel 718, Inconel 750X, etc.)); a reaction vessel made of a cobalt base alloy which contains cobalt as a main component, and also contains chromium, tungsten and the like (for example, Stellite (registered trademark); a reaction vessel made of borosilicate glass; a reaction vessel made of metal having an inner surface subjected to glass lining; a reaction vessel in which an inner surface is treated with polytetrafluoroethylene; and the like. In any case, the effects of the present invention can be obtained.

When the amount of removal of impurities is not sufficient, the reaction solution is sufficiently brought into contact with an aqueous alkali solution and, after removing the aqueous layer, the organic layer may be washed again by mixing with the aqueous alkali solution (alkali washing). Since excess alkali washing may cause an increase in the amount of waste water and also the product may flow out into the aqueous layer, it is recommended that the upper limit of the time of washing using the aqueous alkali solution is about ten times, and more preferably five or less times. There is no particular limitation on the lower limit of the time of washing using the aqueous alkali solution, and it is recommended that washing is preferably carried out at least once, and more preferably twice or more times.

After contact between the reaction solution and the aqueous alkali solution, or after alkali washing which is optionally performed, a fluorosulfonyl imide salt as the product is obtained when the organic layer is separated. The product may be further purified so as to increase the purity of the product.

The fluorosulfonyl imide salt according to the present invention can be easily purified by a separatory extraction method using water, an organic solvent, and a mixed solvent thereof. Examples of the organic solvent include aprotic solvents such as ethylene carbonate, propylene carbonate, butylene carbonate, γ-butyrolactone, γ-valerolactone, dimethoxymethane, 1,2-dimethoxyethane, tetrahydrofuran, 2-methyltetrahydrofuran, 1,3-dioxane, 4-methyl-1,3-dioxolane, methyl formate, methyl acetate, methyl propionate, dimethyl carbonate, ethylmethyl carbonate, diethyl carbonate, acetonitrile, sulfolane, 3-methylsulfolane, dimethyl sulfoxide, N,N-dimethylformamide, N-methyloxazolidinone, valeronitrile, benzonitrile, ethyl acetate, isopropyl acetate butyl acetate, nitromethane and nitrobenzene. The separatory extraction method is preferably an aspect in which water and an organic solvent are used. Accordingly, it is preferred to use, as the organic solvent, an organic solvent which causes separation into two layers when mixed with water. As a matter of course, there may be employed, as the purification method other than the separatory extraction method, conventionally known purification method, for example, a method of washing using the solvents, a reprecipitation method, a recrystallization method, a crystallization method, a method of purification by chromatography and the like.

There may be used, as the solvent used in the present invention, a solvent in which the content of metal components such as Zn, K, Fe, Cr, Ni and Na is 100 ppm or less, and more preferably 10 ppm or less. Such an organic solvent can be prepared, for example, by treating with a metal removal filter or a distiller. The kind and content of the impurities can be analyzed by the below-mentioned ICP emission spectrochemical analysis method.

Then, a method for synthesizing fluorosulfonyl imide according to the present invention will be described below. In the present invention, there is no particular limitation on the method for synthesizing fluorosulfonyl imide, and all conventionally known methods can be employed. Examples of the method include the method described in Patent Document 3 in which (fluorosulfonyl) imide is obtained by distillation of fluorosulfonic acid ($HFSO_3$) in the presence of urea; the method (Patent Documents 1, 2, etc.) in which fluorosulfonyl imide is synthesize from chlorosulfonyl imide using a fluorinating agent; and the like. The method in which fluorosulfonyl imide is synthesize from chlorosulfonyl imide using a fluorinating agent is recommended. The method for synthesizing fluorosulfonyl imide from chlorosulfonyl imide will be described below. First, a method for synthesizing chlorosulfonyl imide which serves as a raw material of fluorosulfonyl imide will be described.

Examples of the method for synthesizing chlorosulfonyl imide include a method in which, after reacting cyanogen chloride with sulfuric anhydride, the product (chlorosulfonyl isocyanate) is reacted with chlorosulfonic acid; a method in which, after reacting amidesulfuric acid with thionyl chloride, the reaction product is further reacted with chlorosulfonic acid (hereinafter referred to as a method for synthesizing di(chlorosulfonyl)imide); a method in which chlorosulfonyl isocyanate is reacted with fluorinated alkylsulfonic acid or fluorosulfonic acid (a method for synthesizing N-(chlorosulfonyl)-N-(fluoroalkylsulfonyl)imide or N-(chlorosulfonyl)-N-(fluorosulfonyl)imide); and the like. As a matter of course, fluorosulfonyl imide may be synthesized using commercially available chlorosulfonyl imide.

Next, the fluorination reaction of chlorosulfonyl imide is performed. There is no particular limitation on timing of the fluorination reaction, and there may be any aspect of an aspect in which, first, the fluorination reaction of chlorosulfonyl imide (proton form) is performed; and an aspect in which, after performing the cation exchange reaction of chlorosulfonyl imide, the fluorination reaction of a chlorosulfonyl imide salt is performed.

There is also no particular limitation on the fluorination reaction of chlorosulfonyl imide (proton form) or a chlorosulfonyl imide salt (hereinafter referred to as chlorosulfonyl imides), and any conventionally known method can be employed. Examples thereof include a method in which chlorosulfonyl imide is halogen-exchanged using the fluorinating agent ($AsF_3$, $SbF_3$) described in Non-Patent Documents 1 and 2; a method in which di(chlorosulfonyl)imide is fluorinated using an ionic fluoride of a monovalent cation as the fluorinating agent, such as KF or CsF described in Patent Documents 1 and 2; and a method in which chlorosulfonyl imides are reacted with a fluoride containing at least one kind of an element selected from the group consisting of elements of Groups 11 to 15 and Periods 4 to 6 (preferably, $CuF_2$, $ZnF_2$, $SnF_2$, $PbF_2$, $BiF_3$, etc.). Among these methods, a method in which chlorosulfonyl imides are reacted with a fluoride containing at least one kind of an element selected from the group consisting of elements of Groups 11 to 15 and Periods 4 to 6, is preferred.

When the fluoride is used in the fluorination reaction of chlorosulfonyl imides, the respective halogen (from chlorine to fluorine) exchange reaction and cation (from protons or specific cations to elements of Groups 11 to 15 and Periods 4 to 6) exchange reaction of chlorosulfonyl imides can be performed in a single stage.

When chlorosulfonyl imides and the above mentioned the fluoride are in liquid form and are dissolved with each other, it is not necessarily required to use a reaction solvent, but an aprotic solvent is preferably used, for example. Specific examples of the reaction solvent include aprotic solvents such as ethylene carbonate, propylene carbonate, butylene carbonate, γ-butyrolactone, γ-valerolactone, dimethoxymethane, 1,2-dimethoxyethane, tetrahydrofuran, 2-methyltetrahydrofuran, 1,3-dioxane, 4-methyl-1,3-dioxolane, methyl formate, methyl acetate, methyl propionate, dimethyl carbonate, ethylmethyl carbonate, diethyl carbonate, acetonitrile, sulfolane, 3-methylsulfolane, dimethyl sulfoxide, N,N-dimethylformamide, N-methyloxazolidinone, valeronitrile, benzonitrile, ethyl acetate, isopropyl acetate, butyl acetate, nitromethane and nitrobenzene. In view of smooth proceeding of the fluorination reaction, it is recommended to use a polar solvent. Among the solvents exemplified above, valeronitrile, ethyl acetate, isopropyl acetate and butyl acetate are preferred. In view of operability upon purification, a solvent having a low boiling point and capable of forming a two-layered state with water is preferred.

Similar to the above-mentioned solvent used in the purification, it is preferred to use, as the reaction solvent, a solvent in which the content of metal components such as Zn, K, Fe, Cr, Ni and Na is 100 ppm or less, and more preferably 10 ppm or less. The kind and content of the impurities can be analyzed by the below-mentioned ICP emission spectrochemical analysis method.

The fluorination reaction can be performed in a conventionally known reaction vessel. It is possible to use all conventionally known reaction vessel, for example, the above-mentioned reaction vessel made of stainless steel; reaction vessel made of carbon steel; reaction vessel made of nickel; reaction vessel made of titanium; reaction vessel made of chromium; reaction vessel made of nickel base alloy; reaction vessel made of cobalt base alloy; reaction vessel made of borosilicate glass; reaction vessel having an inner surface treated with glass lining or polytetrafluoroethylene; and the like.

The completion of the fluorination reaction can be confirmed, for example, by $^{19}$F-NMR or the like. That is, a peak appears at a chemical shift corresponding to fluorine by the progress of the reaction. Furthermore, the relative intensity (integrated value) of the peak increases. Accordingly, the completion of the fluorination reaction may be confirmed while tracing the state of the progress of the reaction by $^{19}$F-NMR. When the reaction time is too long, formation of by-products becomes remarkable, and therefore it is preferred to terminate the fluorination reaction at the time of point when the relative intensity of the peak of the objective product becomes maximum (for example, about 6 hours to 12 hours from the initiation of the reaction).

Chlorosulfonyl imides or a fluorosulfonyl imide salt can be cation-exchanged by reacting with a salt containing a desired cation (cation exchange reaction step). The cation is preferably a cation of an alkali metal such as Li, Na, K, Rb or Cs, or the below-mentioned onium cation. The fluorosulfonyl imide salt containing an alkali metal is useful since it can be used as an ionic conductive material of various electrochemical devices by melting it at high temperature or dissolving it in a proper organic solvent. Among these cations, the cation is preferably a cation of Li or Na, and most preferably a cation of Li. Also, a fluorosulfonyl imide salt containing an onium cation becomes an room temperature molten salt which stably maintains the state of being molten at room temperature, and is suited for use as a material of an ionic conductor of an electrochemical device which withstands use over a long period, or a reaction solvent or the like in organic synthesis.

Examples of the salt containing an alkali metal include alkali metal salts, for example, hydroxides such as LiOH, NaOH, KOH, RbOH and CsOH; carbonates such as $Na_2CO_3$, $K_2CO_3$, $Rb_2CO_3$ and $Cs_2CO_3$; hydrogen carbonates such as $LiHCO_3$, $NaHCO_3$, $KHCO_3$, $RbHCO_3$ and $CsHCO_3$; chlorides such as LiCl, NaCl, KCl, RbCl and CsCl; fluorides such as LiF, NaF, KF, RbF and CsF; alkoxide compounds such as $CH_3OLi$ and $Et_2OLi$; alkyl lithium compounds such as EtLi, BuLi and t-BuLi (Et represents an ethyl group, and Bu represents a butyl group); and the like. The present invention does not exclude a potassium salt from the salts containing an alkali metal and the case of using the potassium salt is included in the present invention as a matter of course. From the viewpoint of more severely controlling the content of potassium in the product, it is recommended to use a salt containing no potassium. When an alkali metal salt other than potassium is used, it is preferred to use an alkali metal salt having a low content of potassium. The amount of potassium contained in the alkali metal salt other than potassium is preferably 1,000 ppm or less, more preferably 100 ppm or less, and still more preferably 10 ppm or less.

On the other hand, the onium cation is preferably an onium cation represented by the general formula (1): $L^+$-Rs (wherein L represents C, Si, N, P, S or O, R(s) are the same or different and represent a hydrogen atom, a fluorine atom, or an organic group and, when R is an organic group, these groups may be mutually bonded; s is 2, 3 or 4, and is a value determined by a valence of an element L; and a bond between L and R may be a single bond or a double bond).

The "organic group" represented by R means a group having at least one carbon atom. The "group having at least one carbon atom" only may have at least one carbon atom, or may have the other atoms such as a halogen atom and a hetero atom, or may have a substituent. Examples of specific substituent include an amino group, an imino group, an amide group, a group having an ether bond, a group having a thioether bond, an ester group, a hydroxyl group, an alkoxy group, a carboxyl group, a carbamoyl group, a cyano group, a disulfide group, a nitro group, a nitroso group, a sulfonyl group and the like.

Specifically, the onium cation represented by the general formula (1) is preferably an onium cation represented by the following general formula (wherein R denotes the same as in the general formula (I)):

[Chemical Formula 1]

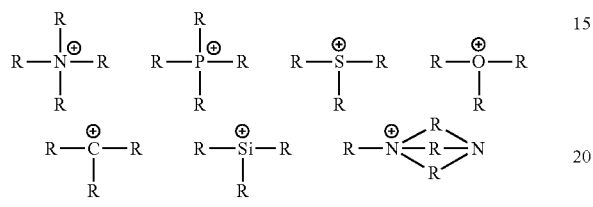

These onium cations may be employed alone, or two or more kinds of them may be employed in combination. Among these, the following onium cations are preferred.

(1) One among nine kinds of heterocyclic onium cations represented by the following general formulas:

[Chemical Formula 2]

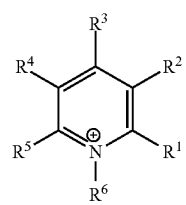 (1-1)

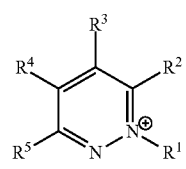 (1-2)

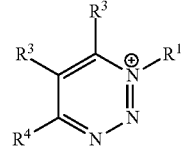 (1-3)

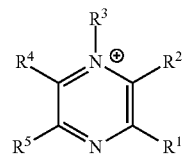 (1-4)

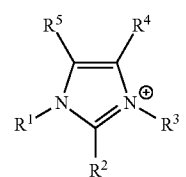 (1-5)

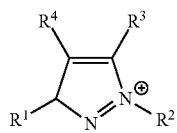 (1-6)

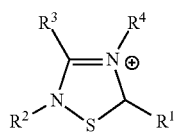 (1-7)

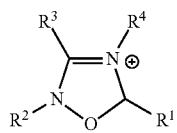 (1-8)

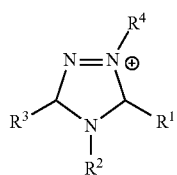 (1-9)

(2) One among five kinds of unsaturated onium cations represented by the following general formulas:

[Chemical Formula 3]

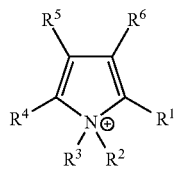 (2-1)

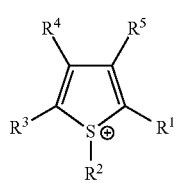 (2-2)

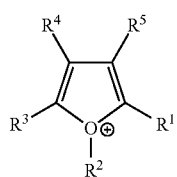 (2-3)

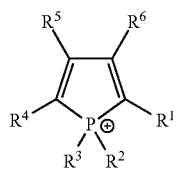 (2-4)

(2-5)

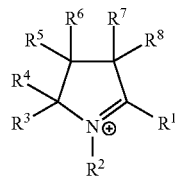

(3) One among ten kinds of saturated cyclic onium cations represented by the following general formulas:

[Chemical Formula 4]

(3-1)

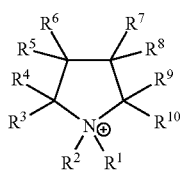

(3-2)

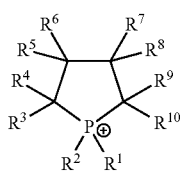

(3-3)

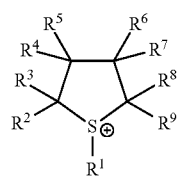

(3-4)

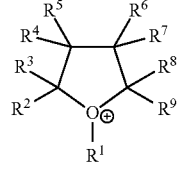

(3-5)

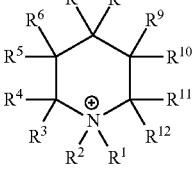

(3-6)

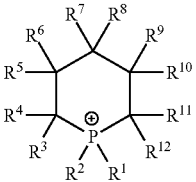

(3-7)

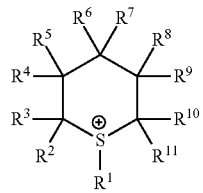

(3-8)

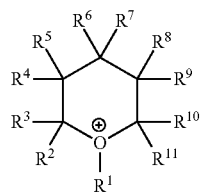

(3-9)

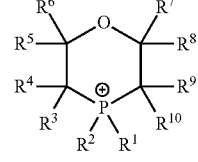

(3-10)

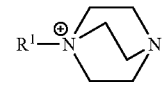

In the above general formulas, $R^1$ to $R^{12}$ are the same or different and denote a hydrogen atom, a fluorine atom or an organic group, and when R is an organic group, these groups may be bonded to each other.

(4) A chain onium cation in which R is hydrogen, an alkyl group having 1 to 8 carbon atoms, an aryl group having 6 to 12 carbon atoms or an aralkyl group having 7 to 13 carbon atoms. Among these onium cations, preferred is an onium cation of the general formula (I) in which L is N. Examples thereof include quaternary ammoniums such as tetramethylammonium, tetraethylammonium, tetrapropylammonium, tetrabutylammonium, tetraheptylammonium, tetrahexylammonium, tetraoctylammonium, triethylmethylammonium, methoxyethyldiethylmethylammonium, trimethylphenylammonium, benzyltrimethylammonium, benzyltributylammonium, benzyltriethylammonium, dimethyldistearylammonium, diallyldimethylammonium, 2-methoxyethoxymethyltrimethylammonium and tetrakis(pentafluoroethyl)ammonium; tertiary ammoniums such as trimethylammonium, triethylammonium, tributylammonium, diethylmethylammonium, dimethylethylammonium and dibutylmethylammonium; secondary ammoniums such as dimethylammonium, diethylammonium and dibutylammonium; primary ammoniums such as methylammonium, ethylammonium, butylammonium, hexylammonium and octylammonium; and ammonium compounds such as N-methoxytrimethylammonium, N-ethoxytrimethylammonium, N-propoxytrimethylammonium and $NH_4$. Among these chain onium cations, ammonium, trimethylammonium, triethylammonium, tributylammonium, triethylmethylammonium, tetraethylammonium and diethylmethyl(2-methoxyethyl)ammonium are preferable as the chain onium cations.

Among the onium cations (1) to (4), five kinds of onium cations represented by the following general formulas:

[Chemical Formula 5]

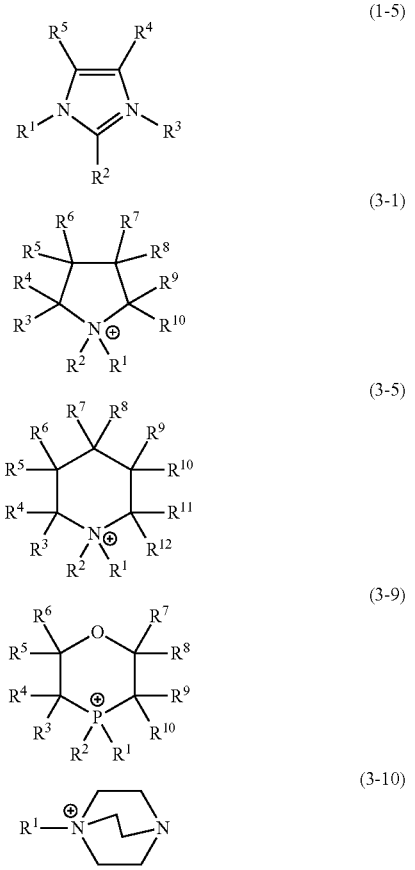

(wherein $R^1$ to $R^{12}$ are as defined above), and the chain onium cation (4) are preferred. $R^1$ to $R^{12}$ denote a hydrogen atom, a fluorine atom or an organic group, and the organic group is preferably a linear, branched or cyclic saturated or unsaturated hydrocarbon group or a fluorocarbon group having 1 to 18 carbon atoms, and more preferably a saturated or unsaturated hydrocarbon group or a fluorocarbon group having 1 to 8 carbon atoms. These organic groups may contain a hydrogen atom, a fluorine atom, a nitrogen atom, an oxygen atom, a sulfur atom, or a functional group such as an amino group, an imino group, an amide group, an ether group, an ester group, a hydroxyl group, a carboxyl group, a carbamoyl group, a cyano group, a sulfone group or a sulfide group. More preferably, $R^1$ to $R^{12}$ have one or more of a hydrogen atom, a fluorine atom, a cyano group, a sulfone group and the like. When two or more organic groups are bonded to each other, the bond may be formed between main skeletons of the organic groups, between the main skeleton of the organic group and the above functional group, or between the functional groups.

Examples of the salt containing an onium cation include halides, hydroxides, carbonates, hydrogen carbonates and the like of the onium cation.

In any of the fluorination reaction step and the cation exchange reaction step, the concentration of a compound having a sulfonyl imide skeleton contained in the reaction solution (for example, fluorosulfonyl imide, fluorosulfonyl imide salt, etc.) is preferably from 1% by mass to 70% by mass. When the concentration is too high, the reaction may become ununiform. In contrast, when the concentration is too low, it is not economical because of low productivity per 1 batch. The concentration is more preferably from 3% by mass to 60% by mass, and still more preferably from 5% by mass to 50% by mass.

According to the production method of the present invention, it is possible to obtain a fluorosulfonyl imide salt which has the content of various impurities reduced to extremely low levels. Also, the di(fluorosulfonyl)imide salt and N-(fluorosulfonyl)-N-(fluoroalkylsulfonyl)imide salt, which have the content of various impurities reduced to extremely low levels, of the present invention are useful as an electrolyte used in a lithium secondary battery, a capacitor and the like, an ionic liquid, or an intermediate or the like of a fluorosulfonyl compound. Particularly, an organic salt of di(fluorosulfonyl)imide and an organic salt of N-(fluorosulfonyl)-N-(fluoroalkylsulfonyl)imide of the present invention are suitably used as a material of an ionic conductor which constitutes a primary battery, and batteries having a charge/discharge mechanism, such as a lithium (ion) secondary battery and a fuel cell, and electrochemical devices such as an electrolytic capacitor, an electric double layer capacitor, a solar battery and an electrochromic display cell.

EXAMPLES

The present invention is more specifically described by the following examples. It is to be understood that the present invention is not limited to the examples, and various appropriate variations made in accordance with the purports described hereinbefore and hereinafter are also included in the technical scope of the present invention.

[ICP Emission Spectrochemical Analysis Method]

An aqueous solution having the concentration of 1% prepared by mixing 0.1 g of the fluorosulfonyl imide salt obtained in the following experimental example with 9.9 g (18.2 MΩcm) of ultrapure water was used as a measuring sample and impurities contained in the product was analyzed using a Multitype ICP Emission Spectrometer ("ICPE-9000", manufactured by Shimadzu Corporation). The quantitative lower limit is 0.1 ppm.

[NMR Measurement]

$^1$H-NMR and $^{19}$F-NMR were measured using "Unity Plus-400" manufactured by Varian (internal standard substance: trifluoromethylbenzene, integration frequency: 16 times).

Experimental Example 1

(Fluorination Reaction)

After weighing 18 g of butyl acetate in a reaction vessel A made of Pyrex (registered trademark) having a capacity of 100 ml under a nitrogen atmosphere, 2.00 g (9.34 mmol) of di(chlorosulfonyl)imide was slowly added dropwise to the reaction vessel A. Next, 1.01 g (9.81 mmol, 1.05 equivalents) of a $ZnF_2$ powder was charged into the reaction vessel A, followed by stirring at room temperature (25° C.) for 6 hours until the powder was completely dissolved.

After weighing 5.4 g of 25% by mass ammonia water (8.48 equivalents, temperature 25° C.) in an other reaction vessel B made of Pyrex (registered trademark) having a capacity of 100 ml, the reaction solution of the reaction vessel A was slowly added dropwise to the reaction vessel B while stirring ammonia water. After the completion of the dropwise addition of the reaction solution, stirring was terminated and the aqueous layer containing by-products such as $ZnCl_2$ was removed from the reaction solution separated into two layers to separate the organic layer containing fluorosulfonyl imide. The concentration of fluorosulfonyl imide contained in the obtained organic layer was analyzed by $^{19}$F-NMR (CD$_3$CN) (yield amount (fluorosulfonyl imide anion): 1.36 g, yield: 81%). The amount of various impurities contained in the obtained fluorosulfonyl imide was measured. The results are shown in Table 1.

$^{19}$F-NMR (CD$_3$CN): δ56.0

The components contained in the aqueous layer separated from the organic layer were confirmed by an ICP emission spectrometer. The results revealed that the content of zinc was 50,000 ppm or more. As a result, it is considered that zinc derived from fluoride ZnF$_2$ was converted into water-soluble tetraammine zinc ion ([Zn(NH$_3$)$_4$]$^{2+}$) coordinated with ammonia by contact with ammonia water and the zinc ion complex was extracted in the aqueous layer. As a result, the content of impure ion components in the product was reduced.

(Cation Exchange Reaction)

Next, 2 equivalents of an aqueous LiOH saturated solution (about 3 g) with regard to fluorosulfonyl imide contained in the obtained organic layer was added to the obtained organic layer, followed by stirring. Then, the aqueous layer was removed from the reaction solution and butyl acetate was distilled from the obtained organic layer, followed by evaporation to dryness to obtain a lithium salt of fluorosulfonyl imide as a white solid (yield amount: 1.27 g, yield: 90%). The amount of impurities contained in the obtained lithium salt of fluorosulfonyl imide is shown in Table 2.

$^{19}$F-NMR (CD$_3$CN): δ56.0.

Experimental Example 2

In the same manner as in Experimental Example 1, except that a reaction vessel made of Hastelloy (registered trademark) C22 was used in place of the reaction vessels A, B made of Pyrex (registered trademark), fluorosulfonyl imide_ (yield amount: 1.35 g, yield: 80%) and a lithium salt of fluorosulfonyl imide (yield amount: 1.19 g, yield: 85%) was produced. The amount of impurities contained in the obtained fluorosulfonyl imide and lithium salt thereof are shown in Table 1 and Table 2.

Experimental Example 3

In the same manner as in Experimental Example 1, a zinc fluoride powder was added to a mixed solution of butyl acetate and di(chlorosulfonyl)imide. After dissolving zinc fluoride, 1.35 g (9.81 mmol, 1.05 equivalents) of triethylamine hydrochloride was added to the reaction vessel A, followed by stirring for 10 minutes. $^1$H-NMR revealed that a triethylamine salt of fluorosulfonyl imide was formed (yield amount: 1.32 g, yield: 78%). The amount of various impurities contained in the obtained fluorosulfonyl imide was measured. The results are shown in Table 1.

$^1$H-NMR (CD$_3$CN): δ3.1 (6H), 1.2 (9H)
$^{19}$F-NMR (CD$_3$CN): δ56.0.

In the same manner as in Experimental Example 1, except that the obtained triethylamine salt of fluorosulfonyl imide was used, a cation exchange reaction was performed to produce a lithium salt of fluorosulfonyl imide (yield amount: 1.15 g, yield: 84%). The amount of impurities contained in the obtained lithium salt of fluorosulfonyl imide is shown in Table 2.

$^{19}$F-NMR (CD$_3$CN): δ56.0

Experimental Example 4

In the same manner as in Experimental Example 1, except that 5.4 g of 25% by mass ammonia water (8.48 equivalents, temperature: 25° C.) was slowly added to the reaction solution in the reaction vessel A made of Pyrex (registered trademark) after the fluorination reaction of di (chlorosulfonyl imide), a fluorosulfonyl imide salt (yield amount: 1.32 g, yield: 78%) and a lithium salt of fluorosulfonyl imide (yield amount: 1.13 g, yield: 83%) were produced. The amount of impurities contained in the obtained fluorosulfonyl imide and lithium salt thereof is shown in Table 1 and Table 2.

Experimental Example 5

In the same manner as in Experimental Example 2, except that 5.4 g of 25% by mass ammonia water (8.48 equivalents, temperature: 25° C.) was slowly added to the reaction solution in the reaction vessel made of Hastelloy (registered trademark) C22 after the fluorination reaction of di (chlorosulfonyl imide), a fluorosulfonyl imide (yield amount: 1.20 g, yield: 71%) and a lithium salt of fluorosulfonyl imide (yield amount: 1.06 g, yield: 85%) were produced. The amount of impurities contained in the obtained fluorosulfonyl imide and lithium salt thereof is shown in Table 1 and Table 2.

Experimental Example 6

After weighing 1.8 kg of butyl acetate in a reaction vessel A made of Pyrex (registered trademark) having a capacity of 3 l under a nitrogen atmosphere, 200 g (934 mmol) of di(chlorosulfonyl)imide was slowly added dropwise to the reaction vessel A. Next, 101 g (981 mmol, 1.05 equivalents) of a ZnF$_2$ powder was charged into the reaction vessel A, followed by stirring at room temperature (25° C.) for 6 hours until the powder was completely dissolved.

After weighing 5.4 kg of 25% by mass ammonia water (8.48 equivalents, temperature 25° C.) in an other reaction vessel B made of Pyrex (registered trademark) having a capacity of 10 l, the reaction solution of the reaction vessel A was slowly added dropwise to the reaction vessel B while stirring ammonia water. After the completion of the dropwise addition of the reaction solution, stirring was terminated and the aqueous layer containing by-products such as ZnCl$_2$ was removed from the reaction solution separated into two layers to separate the organic layer containing fluorosulfonyl imide. The concentration of fluorosulfonyl imide contained in the obtained organic layer was analyzed by $^{19}$F-NMR (CD$_3$CN) (yield amount: 133 g, yield: 79%). The amount of various impurities contained in the obtained fluorosulfonyl imide was measured. The results are shown in Table 1.

$^{19}$F-NMR (CD$_3$CN): δ56.0

Next, 2 equivalents of an aqueous LiOH saturated solution (about 300 g) with respect to fluorosulfonyl imide contained in the obtained organic layer was added to the obtained organic layer, followed by stirring. Then, the aqueous layer was removed from the reaction solution and butyl acetate was distilled from the obtained organic layer, followed by evaporation to dryness to obtain a lithium salt of fluorosulfonyl imide as a white solid (yield amount: 125 g, yield: 90%). The amount of impurities contained in the obtained lithium salt of fluorosulfonyl imide is shown in Table 2.

$^{19}$F-NMR (CD$_3$CN): δ56.0

Experimental Example 7

In the same manner as in Experimental Example 1, except that 5.4 g of ultrapure water (temperature 25° C., 18.2

MΩcm (amount of all ion components <1 ppm)) was used in place of ammonia water, fluorosulfonyl imide was produced (yield amount: 1.10 g, yield: 66%). The amount of various impurities contained in the obtained fluorosulfonyl imide was measured. The results are shown in Table 1.

Experimental Example 8

In the same manner as in Experimental Example 2, except that 5.4 g of ultrapure water was used in place of ammonia water, fluorosulfonyl imide was produced (yield amount: 1.01 g, yield: 60%). The amount of various impurities contained in the obtained fluorosulfonyl imide was measured. The results are shown in Table 1.

Experimental Example 9

In the same manner as in Experimental Example 7, except that fluorosulfonyl imide was brought into contact with ultrapure water and further brought into contact with 5.4 g of ultrapure water twice, fluorosulfonyl imide (yield amount: 0.48 g, yield: 29%) was produced. The amount of various impurities contained in the obtained fluorosulfonyl imide was measured. The results are shown in Table 1.

Experimental Example 10

In the same manner as in Experimental Example 1, except that the fluorosulfonyl imide obtained in Experimental Example 7 was used as a raw material, a cation exchange reaction was performed to produce a lithium salt of fluorosulfonyl imide (yield amount: 0.86 g, yield: 75%). The amount of impurities contained in the obtained lithium salt of fluorosulfonyl imide is shown in Table 2.

Experimental Example 11

In the same manner as in Experimental Example 1, except that the fluorosulfonyl imide obtained in Experimental Example 8 was used as a raw material, a cation exchange reaction was performed to produce a lithium salt of fluorosulfonyl imide (yield amount: 0.77 g, yield: 73%). The amount of impurities contained in the obtained lithium salt of fluorosulfonyl imide is shown in Table 2.

Experimental Example 12

Lithium bis(fluorosulfonyl)imide (LiFSI) was obtained based on the description of Japanese Unexamined Patent Application Publication No. 2004-522681. In Experimental Example 12, contact between a reaction solution and an aqueous alkali solution was not performed. The amount of impurities contained in the obtained lithium salt of fluorosulfonyl imide is shown in Table 2.

The description "<1" in Tables 1 and 2 indicates 0.1 ppm or more and less than 1 ppm as a quantitative limit.

TABLE 1

|  | Impurity Content (ppm) | | | | | | | | | | |
| --- | --- | --- | --- | --- | --- | --- | --- | --- | --- | --- | --- |
|  | Si | B | Fe | Cr | Mo | Ni | Zn | Cl | $FSO_3NH_2$ | $FSO_3H$ | K |
| Experimental Example 1 | 11 | 56 | <1 | <1 | <1 | <1 | 140 | 460 | <1 | <1 | <1 |
| Experimental Example 2 | <1 | <1 | 4 | 23 | 14 | 28 | 170 | 540 | <1 | <1 | <1 |
| Experimental Example 3 | 14 | 48 | <1 | <1 | <1 | <1 | 210 | 360 | <1 | <1 | <1 |
| Experimental Example 4 | 46 | 120 | <1 | <1 | <1 | <1 | 350 | 670 | <1 | <1 | <1 |
| Experimental Example 5 | <1 | <1 | 58 | 330 | 190 | 460 | 280 | 710 | <1 | <1 | <1 |
| Experimental Example 6 | 23 | 49 | <1 | <1 | <1 | <1 | 240 | 550 | <1 | <1 | <1 |
| Experimental Example 7 | 4800 | 1700 | <1 | <1 | <1 | <1 | 34000 | 150000 | 42000 | <1 | <1 |
| Experimental Example 8 | <1 | <1 | 1160 | 3500 | 2200 | 6500 | 41000 | 120000 | 38000 | <1 | <1 |
| Experimental Example 9 | 4400 | 1200 | <1 | <1 | <1 | <1 | 3700 | 7700 | 49000 | <1 | <1 |

As shown in Table 1, in Experimental Examples 7 to 9 in which contact between the reaction solution and the aqueous alkali solution was not performed, a large amount of impurities derived from the reaction vessel (more than 1,000 ppm in one kind of a component alone) and the reaction by-products (more than 30,000 ppm in total) were contained in the product, whereas, the amount of impurities contained in the product was reduced in Experimental Examples 1 to 5 in which contact between the reaction solution and the aqueous alkali solution was performed after the fluorination reaction, and Experimental Example 6 in which fluorosulfonyl imide was produced in a larger scale.

The inner surface of the reaction vessel (made of Pyrex (registered trademark)) used in Experimental Examples 7 and 9 was white opaque and gloss observed before use was lost. Similarly, also in the reaction vessel (made of Hastelloy (registered trademark) C22) used in Experimental Example 8, the inner surface thereof had opaque and gloss-free appearance and was observed by a microscope (USB Digital Microscope "YDU-2", manufactured by YASHIMA OPTICAL CO., LTD., magnification: 200 times). The results revealed that a lot of pores are formed on the surface and also the relevant portion changes to black and thus corrosion occurs. In the reaction vessels used in Experimental Examples 1 to 6, such a change was not recognized and the inner surface of the reaction vessels had the same gloss as the gloss before initiation of the reaction even after the completion of the reaction.

TABLE 2

| | Impurity Content (ppm) | | | | | | | | | | |
|---|---|---|---|---|---|---|---|---|---|---|---|
| | Si | B | Fe | Cr | Mo | Ni | Zn | Cl | FSO$_3$NH$_2$ | FSO$_3$H | K |
| Experimental Example 1 | <1 | 4 | <1 | <1 | <1 | <1 | 6 | 6 | <1 | <1 | <1 |
| Experimental Example 2 | <1 | <1 | <1 | 2 | 3 | 3 | 4 | <1 | <1 | <1 | <1 |
| Experimental Example 3 | <1 | 3 | <1 | <1 | <1 | <1 | 8 | 2 | <1 | <1 | <1 |
| Experimental Example 4 | 4 | 9 | <1 | <1 | <1 | <1 | 24 | 9 | <1 | <1 | <1 |
| Experimental Example 5 | <1 | <1 | 7 | 30 | 27 | 55 | 33 | 14 | <1 | <1 | <1 |
| Experimental Example 6 | <1 | 2 | <1 | <1 | <1 | <1 | 13 | 10 | <1 | <1 | <1 |
| Experimental Example 10 | 550 | 230 | <1 | <1 | <1 | <1 | 2200 | 1100 | <1 | <1 | <1 |
| Experimental Example 11 | <1 | <1 | 60 | 290 | 170 | 710 | 2500 | 940 | <1 | <1 | <1 |
| Experimental Example 12 | <1 | <1 | <1 | <1 | <1 | <1 | 1 | 5 | <1 | <1 | 5489 |

As is apparent from the results of Experimental Examples 1 to 6 and 10 to 11 shown in Tables 1 and 2, the amount of impurities derived from the reaction vessel and the amount of reaction by-products are more reduced by a cation exchange reaction. However, the amount of various impurities contained in the products of Examples 10 to 11, in which a cation exchange reaction was performed using the obtained fluorosulfonyl imide as a raw material in Experimental Examples 7 and 8, was large as compared with Experimental Examples 1 to 6 in which the alkali contact step was employed. That is, it is apparent that it is difficult to sufficiently reduce the amount of various impurities up to a practical level only by the cation exchange reaction, while the amount of impurities in the product is efficiently reduced without decreasing a yield by using the alkali contact step in combination with the cation exchange reaction.

As is apparent from these results, according to the present invention, since corrosion of a reaction vessel or the like is suppressed, a fluorosulfonyl imide salt is continuously produced over a long period, and also a fluorosulfonyl imide salt having reduced content of impurities is obtained.

Experimental Examples 13 and 14

Charge and Discharge Test

Using LiFSI (potassium content: less than 1 ppm, Experimental Example 13) obtained in Experimental Example 1 and LiFSI (potassium content: 5,489 ppm, Experimental Example 14) obtained in Experimental Example 12 as electrolytes, coin cells, Model CR2032 were produced, and then a charge and discharge test was performed. In both cases, an electrolytic solution was prepared by dissolving LiFSI in a solvent, obtained by mixing ethylene carbonate (EC) and ethylmethyl carbonate (EMC) in a volume ratio of 1:1, so that the concentration became 1M (mol/L). EC and EMC, LBG grade, manufactured by KISHIDA CHEMICAL Co., Ltd. were used as a solvent.

Coin cells were produced by using artificial graphite ("MAGD", manufactured by Hitachi Chemical Co., Ltd.) as a positive electrode and a lithium foil (thickness: 0.5 mm, manufactured by Honjo Metal Co., Ltd.) as a negative electrode, and arranging the positive electrode and the negative electrode in opposition to each other sandwiching a separator ("Celgard (registered trademark) 2400", single-layered polypropylene separator, manufactured by Celgard) and a glass filter ("GA-100", manufactured by ADVANTEC), and filling the space between the electrodes with an EC/EMC (1/1) solution having a concentration of 1 M of LiFSI.

First, the coin cells thus produced were stabilized at 30° C. for 6 hours, and the discharge capacity up to 40 cycles was measured by a charge and discharge test device (BS2501, manufactured by KEISOKUKI CENTER CO., LTD.). Upon each charge and discharge, a charge and discharge downtime for 15 minutes was provided and the test was performed at a charge and discharge rate of 0.1 C in a range of 0.02 to 3 V. The results are shown in FIG. 1.

As is apparent from FIG. 1, in Experimental Example 13 in which LiFSI containing 1 ppm of potassium obtained in Experimental Example 1 is used, both the initial capacity and the capacity after 40 cycles were high as compared with Experimental Example 14 in which LiFSI containing 5,489 ppm of potassium obtained in Experimental Example 12 was used. It is considered that the capacity was decreased in Experimental Example 14 since the positive electrode was deteriorated due to potassium as impurities.

INDUSTRIAL APPLICABILITY

According to the present invention, even when an acid is formed in a synthesis process, a reaction vessel or the like is less likely to be corroded, thus enabling a continuous operation for the production of a fluorosulfonyl imide salt. Therefore, the present invention is industrially extremely significant. Also, a di(fluorosulfonyl)imide salt and an N-(fluorosulfonyl)-N-(fluoroalkylsulfonyl)imide salt, which have the content of various impurities reduced to extremely low levels in the present invention, obtained by the production method of the present invention are useful as an electrolyte used in a lithium secondary battery, a capacitor and the like, an ionic liquid, or an intermediate of a sulfonyl imide salt. Also, it is expected that use of the fluorosulfonyl imide salt of the present invention as an electrolyte leads to a high-performance electrochemical device.

The invention claimed is:
1. A method for producing a di (fluorosulfonyl) imide salt or N-(fluorosulfonyl)-N-(fluoroalkylsulfonyl) imide salt comprising a contacting step wherein a reaction solution is brought into contact with an aqueous alkali solution by pouring the reaction solution into the aqueous alkali solution after a fluorination of chlorosulfonyl imide or a salt thereof and prior to a cation exchange reaction so as to remove an impurity, wherein the aqueous alkali solution is selected from the group consisting of ammonia water, an aqueous solution of aliphatic amines, alkanolamines or ethylene oxide adducts of these amines, and heterocyclic amines, and an amount of a basic substance in the aqueous alkali solution is 1 mol or more per 1 mol of a fluorinating agent in the fluorination, and wherein the di (fluorosulfonyl) imide salt or N-(fluorosulfonyl)-N-(fluoroalkylsulfonyl) imide salt contains:

5,000 ppm by mass or less of K, 500 ppm by mass or less of each of Cl, Si, B, Fe, Cr, Mo and Ni, at least 0.1 ppm by mass of a total of Si, B, Fe, Cr, Mo and Ni, 0.1 ppm to 5,000 ppm by mass of a total of $FSO_2NH_2$ and $FSO_3H$, and 1,000 ppm by mass or less of a total of metal elements selected from the group consisting of Zn, Cu and Bi.

2. The method according to claim 1, wherein the reaction solution is brought into contacted with the aqueous alkali solution at a temperature of about 5° C. to 50° C.

3. The method according to claim 1, wherein the aqueous alkali solution is used in an amount of from 1 part by mass to 100 parts by mass based on 100 parts by mass of the reaction solution.

4. The method according to claim 1, wherein the aqueous alkali solution is ammonia water.

5. The method according to claim 1, wherein the di (fluorosulfonyl) imide salt or N-(fluorosulfonyl)-N-(fluoroalkylsulfonyl) imide salt is a di(fluorosulfonyl)imide salt.

6. The method according to claim 1, wherein the di (fluorosulfonyl) imide salt or N-(fluorosulfonyl)-N-(fluoroalkylsulfonyl) imide salt is a lithium salt or sodium salt of di (fluorosulfonyl) imide or N-(fluorosulfonyl)-N-(fluoroalkylsulfonyl) imide.

* * * * *